(12) United States Patent
Estrate

(10) Patent No.: US 8,578,920 B2
(45) Date of Patent: Nov. 12, 2013

(54) PAINTBALL HOPPER WITH INTEGRATED IMAGING SYSTEM

(76) Inventor: Evan A. Estrate, Lorton, VA (US)

( * ) Notice: Subject to any disclaimer, the term of this patent is extended or adjusted under 35 U.S.C. 154(b) by 449 days.

(21) Appl. No.: 12/875,466

(22) Filed: Sep. 3, 2010

(65) Prior Publication Data

US 2011/0056470 A1   Mar. 10, 2011

Related U.S. Application Data

(60) Provisional application No. 61/239,946, filed on Sep. 4, 2009.

(51) Int. Cl.
*F41B 11/02* (2006.01)

(52) U.S. Cl.
USPC .......................................................... 124/51.1

(58) Field of Classification Search
USPC ........................... 124/51.1; 493/120, 122, 348
See application file for complete search history.

(56) References Cited

U.S. PATENT DOCUMENTS

| | | | |
|---|---|---|---|
| 6,502,567 B1* | 1/2003 | Christopher et al. | 124/51.1 |
| 6,882,864 B2* | 4/2005 | Miyake | 455/556.1 |
| 2005/0059177 A1* | 3/2005 | Rhodes | 438/22 |
| 2005/0066950 A1* | 3/2005 | Yu | 124/45 |
| 2006/0082730 A1* | 4/2006 | Franks | 352/95 |
| 2007/0044365 A1* | 3/2007 | Deken | 42/146 |
| 2008/0053422 A1* | 3/2008 | Estrate | 124/49 |

* cited by examiner

*Primary Examiner* — Gene Kim
*Assistant Examiner* — Amir Klayman
(74) *Attorney, Agent, or Firm* — Roylance, Abrams, Berdo & Goodman, L.L.P.

(57) ABSTRACT

Hoppers and similar loading systems have an integrated imaging system for still and/or video capture, display and/or networked transmission. The imaging system allows real time capture, display and/or transmission live paintball play action from the point of view of the player. Images can be transmitted to team mates in proximity with a corresponding imaging system and/or to off field personnel. Such image transmission from the perspective of the hopper held by the player permits coordination of on field activities among the team members or by an off field coach. In tournament play, the real time video transmission can be broadcast through the off field systems for display to a local audience or streamed to an internet audience. Recordable media within each hopper system permit the recorded images to be stored for later analysis.

9 Claims, 3 Drawing Sheets

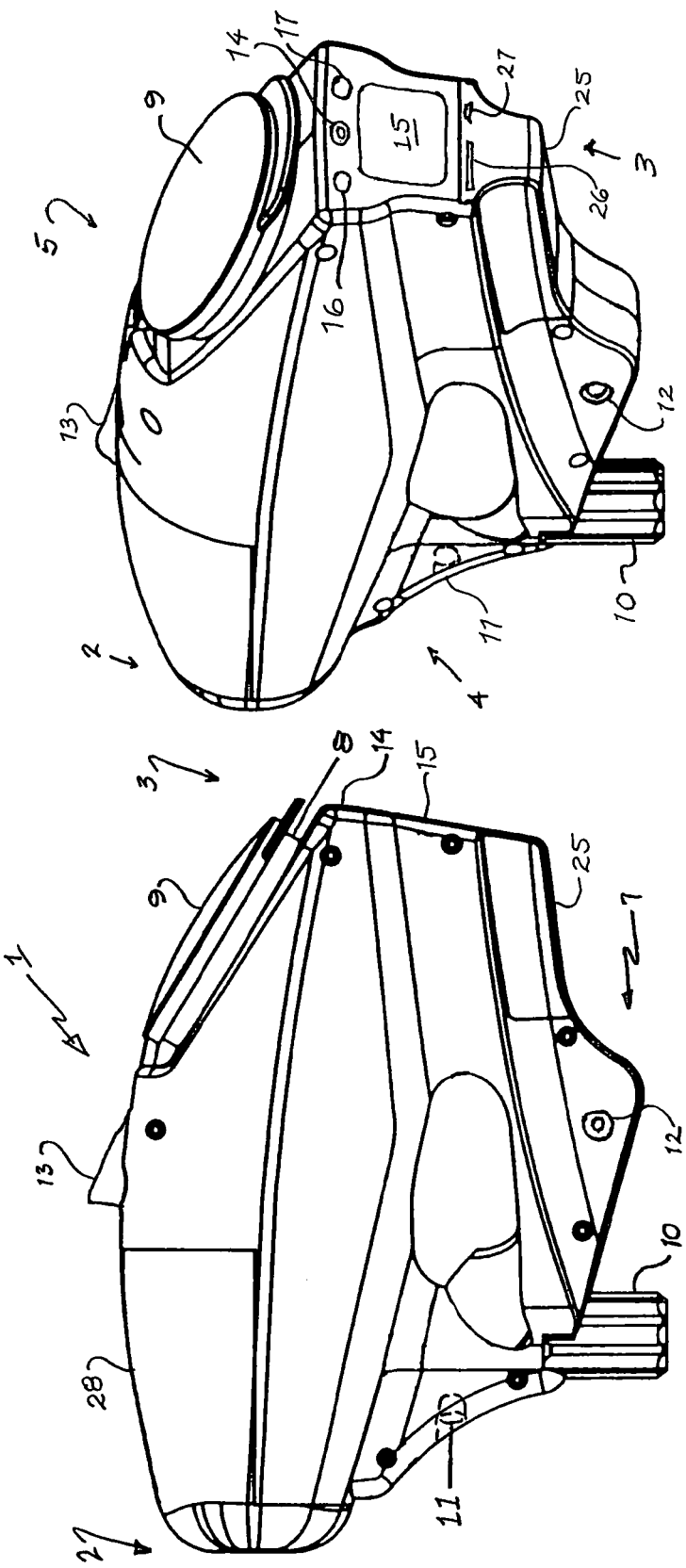

PAINTBALL HOPPER WITH INTEGRATED IMAGING SYSTEM

This application claims benefit under 35 U.S.C. §119 from U.S. Provisional Application No. 61/239,946, filed on Sep. 4, 2009, the entire content of which is incorporated herein by reference.

FIELD OF THE INVENTION

The invention relates generally to paintball hoppers that are used in the sport of paintball to hold a reservoir of paintball rounds. The hoppers of the present invention have an integrated image capture system for still or video images. When oriented towards the players forward direction, i.e., facing oncoming opponents, the image capture system provides a "player's eye" view of the game action.

BACKGROUND OF THE INVENTION

The game of paintball is one in which two or more teams try to capture each other's flags and the players on each team are armed with compressed gas powered markers that shoot paintballs in the form of gelatin or plastic spherical balls or capsules that contain biodegradable colored liquids. During the game when a player is hit with a paintball from an adversary's gun, the paintball ruptures and leaves a colored mark on the hit player who then must retire from the game. This action means that protective face masks are mandatory, and a reservoir hopper for paintball rounds that are fed automatically into the marker, usually by gravity or motor-assisted power feed, are highly recommended for all players.

The action of a paintball game can span a range from strategic scenario games (often played in wooded areas over 20-60 minutes) to fast-paced tournament games in which the game can be over in 1-3 minutes. For many, it would be desirable to capture and re-live the excitement of the game or replay the footage to study tactics and techniques for the next tournament. The mask, however, prevents the use of conventional handheld cameras or video equipment It would be desirable to have an image capturing system that could be used by a paintball player during a game.

It would also be desirable to have an image capturing system that would capture still or video imagery from the player's perspective in a manner that was automatic and operable while wearing a protective face mask.

It would further be useful to have an image capturing system that would transmit the captured images via a secured wireless connection to teammates on or off the playing field, to a central command center or to an announcer's booth for re-broadcast to conventional or internet-based programming.

SUMMARY OF THE INVENTION

It is an object of the invention to provide amateur and professional paintball players with an image capturing system that could be used by a paintball player during a game.

It is also an object of the invention to provide an image capturing system that would capture still or video imagery from the player's perspective in a manner that was automatic and operable by the player or by a remote operator while the player is wearing a protective face mask.

It is further an object of the invention to provide an image capturing system that would transmit the captured images via a secured wireless connection to teammates on or off the playing field, to a central command center or to an announcer's booth for re-broadcast to conventional or internet-based programming.

In accordance with these and other objects of the invention that will become apparent from the description provided herein, paintball hoppers according to the invention comprise:

(a) a paintball reservoir hopper exhibiting a forward end away from a player using said hopper, a rear end facing toward a player using said hopper, left and right lateral side portions, a top portion and a bottom portion, said reservoir hopper having:

(i) an enlarged first opening in said top surface that is dimensioned to permit multiple paintballs to pass through said first opening side-by-side at the same time but obstructed with a cover obstruction when disposed in a first position that prevents paintballs within said reservoir hopper from falling out but which can be displaced to a second position so as to allow additional paintballs to be introduced into said reservoir hopper through said first enlarged opening for refilling said reservoir hopper, and (ii) a discharge neck in said bottom portion having a second diameter that is sufficiently small to allow only one paintball at a time to pass side-by-side through said diameter, said discharge neck having an elongated length sufficient to permit a plurality of paintballs to stack within said neck at the same time for discharge into a paintball marker attached thereto;

(b) at least one camera integrated into said reservoir hopper and positioned to capture images from at least one of a forward direction, a left lateral direction, a right lateral direction and a rear direction; and (c) an image display located at said rear end and electrically associated with said at least one camera to display images captured by said at least one camera.

The present invention provides an image capturing system that is integrated into a paintball hopper reservoir. With at least one, and preferably multiple cameras positioned around the hopper, the present invention can capture and optionally transmit real-time, live action still or video images from the player's perspective. Whether transmitted to a viewing audience or captured for later analysis, the present invention provides a way to bring the action of paintball to a new audience.

BRIEF DESCRIPTION OF THE DRAWINGS

FIG. 1 is a side view of a paintball reservoir hopper according to the present invention with cameras located on each side of the hopper, at the front above the feed neck and at the rear above the image display screen.

FIG. 2 is an isometric view of the hopper of FIG. 1.

DETAILED DESCRIPTION OF THE INVENTION

Figure 3:
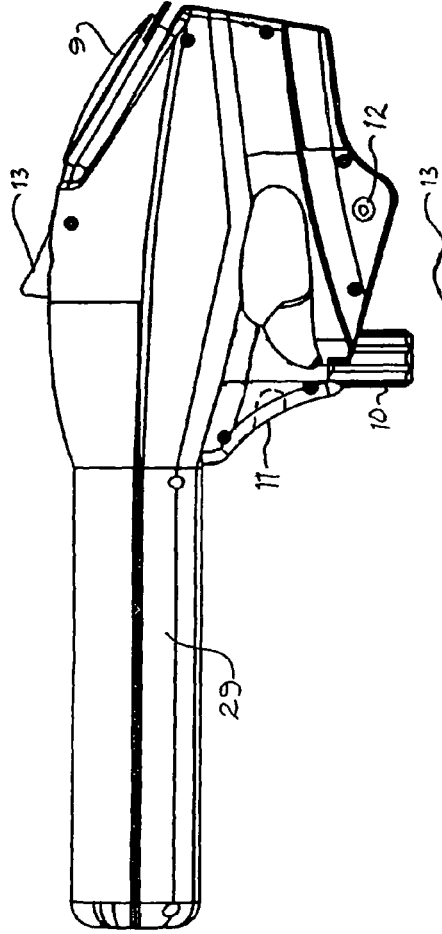
FIG. 3 is a side view of a paintball reservoir in which a removable portion of the hopper has been replaced with a second portion extending in a forward direction that provides the hopper with expanded interior volume for a higher paintball carrying capacity. The second portion extends in a forward direction so as to minimize the exposed, forward-facing surface area of the hopper that is exposed to an opponent during play.

The present invention generally relates to a paintball reservoir hopper having an integrated image capturing system that will capture, display and/or transmit images to a display system located at the rear end of the hopper. The addition of a wireless transmission system further provides a hopper that broadcasts live action imagery to teammates either on or off the field of play and/or to a remote receiver for analysis or re-broadcast to an audience.

The image capturing systems that can be used in the present invention are preferably those that can operate on direct current (DC) battery power, have a resolution within the range of 1-20 megapixels, are light in weight and can capture still images as well as video imagery. Imaging systems that are particularly well suited are those found in cellular telephones that have integrated camera lenses of a fixed focal length and aperture diameter configured to avoid the need for an image focusing system. Exemplary imaging devices are preferably based on charge coupled device (CCD) or CMOS pixel array imaging systems. Suitable camera and imaging systems are disclosed in, inter alia, the following U.S. patents whose disclosures are herein incorporated by reference: Flynn U.S. Pat. No. 5,606,365, Korus U.S. Pat. No. 5,893,037, Adair et al. U.S. Pat. No. 6,452,626, Nguyen U.S. Pat. No. 6,473,631, Adair et al. U.S. Pat. No. 6,424,369, and Nguyen U.S. Pat. No. 6,882,864.

The display system is preferably located at the rear end of the reservoir hopper and positioned to show the captured images to the player. Screen display systems useful for the present invention are those found in appropriately sized LED, LCD, Organic LED displays that are useful in cell phones. If preferred, a touch sensitive screen can be used although such sensitivity should provide for a mechanism or switch to turn off the screen input to avoid inadvertent input through the screen during rigorous or active game play.

Images captured by the imaging system or systems can be stored in a local storage device (such as a silicon-based drive) or removable media (such as a media card, Compact Flash, SmartMedia, flash drive, and the like). One or more external connections, such as a standard or mini USB connector, can be used to provide a connection to linking the reservoir hopper of the invention to a computer for extracting stored images, updating firmware within the image capture or hopper electronics.

In addition or in the alternative, images captured by the imaging system can be transmitted by a wireless transmission system to a receiver separate from the transmitting hopper. The receiver can be a teammate have a hopper according to the present invention that includes a receiver system in electronic communication with the transmitting hopper. Preferably, such a transmission system will use a standardized communications protocol having an option to secure the communicated information with a password or similar security mechanism, e.g., Bluetooth or a networking protocol consistent with sections 802.11(a), (b), (g) or (n).

The materials from which the major components of the reservoir hopper can be selected from polyolefin plastics, clear or opaque plastics, hi-impact or fiber reinforced plastic, fiberglass or carbon fiber composites or equivalent materials that have high strength, light weight and weather resistance.

The present invention is conveniently described with reference to the attached drawing figures. Similar parts and components will use the same reference number.

As shown in FIG. 1, paintball hopper reservoir 1 has a forward end 2, a rear end 3, left lateral side portion 4, right lateral side portion 5, top portion 6 and bottom portion 7. Enlarged first opening 8 is dimensioned large enough to allow multiple paintballs, e.g., 4-30, to be introduced into paintball reservoir hopper reservoir 1 at the same time as when a full pod of paintballs is dumped into hopper 1.

Cover obstruction 9 prevents paintballs from falling out of opening 8 during game play. Cover obstruction 9 can be a solid cover (as shown) or a speed fill (not shown). A speed fill cover is generally made with a plurality of flexible or deflectable fingers that extend across opening 8. These fingers deflect inwardly into the interior volume of hopper 1 when filling the hopper but resist deflection outwardly thereby restraining the paintball rounds within hopper 1.

Hopper 1 also has discharge neck 10 extending out of bottom portion 7. The diameter of neck 10 should be sufficiently large to allow paintball rounds to traverse the length of neck 10 without restriction to the neck diameter but sufficiently small in diameter that two paintballs do not become lodged or stuck from frictional forces on each other within neck 10. Preferably, neck 10 has an elongated length sufficient to allow a plurality, preferably 2-5 paintballs to become stacked within neck 10 for rapid feed into a connected paintball marker (not shown) during game play.

Figure 4:
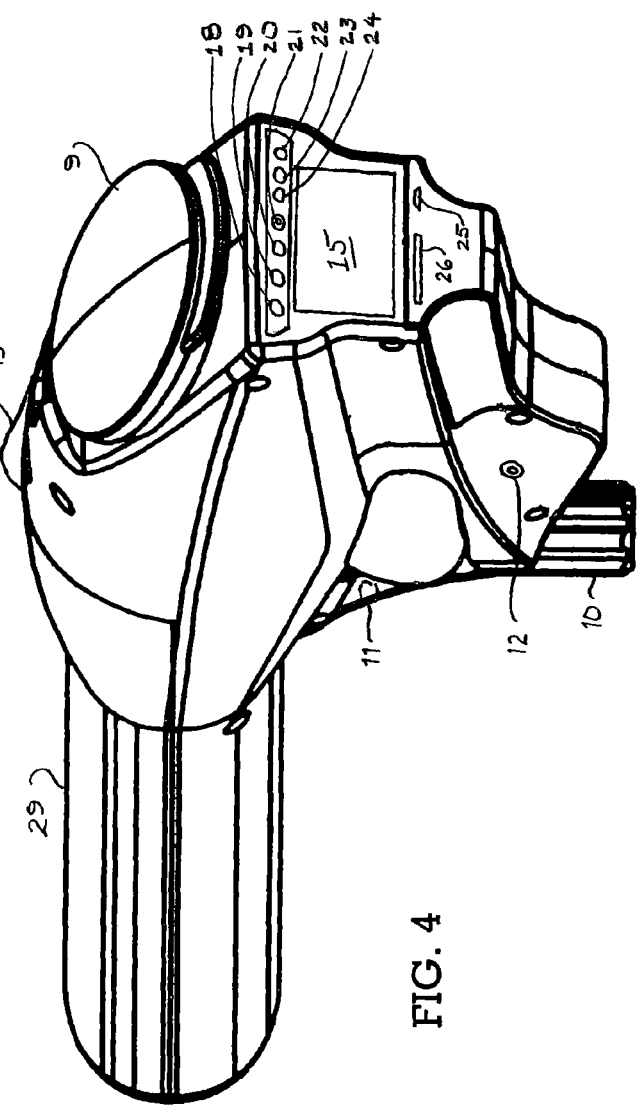
FIG. 4 is an isometric view of the hopper in FIG. 3.

Hopper 1 also has at least one camera, such as camera 11, 12, 13 and 14 that are integrated into hopper 1 and positioned to display a plurality of view from the perspective of the player. An additional camera (not shown) may also be disposed on right lateral side portion 5. Image display screen 15 is used to display images captured by any of cameras 11-14. Control buttons 16, 17 (FIG. 2) and 18-24 (FIG. 4) are used to control the operation of hopper 1 and/or display screen 15.

Power for hopper 1 is preferably supplied by batteries in battery compartment 25. Media card slot 26 can be used to record captured images onto removable magnetic media for later display, review and/or broadcast. USB port 27 can be used to connect hopper 1 to a computer in the event images are stored in an integrated recording media, such as a silicon drive (not shown), to upload new software instructions to memory and/or circuit components of hopper 1 or to recharge batteries in battery compartment 25.

The present invention can be applied to virtually any shape or configuration of paintball hopper reservoir device. All camera or cameras, circuit boards, wiring and battery connections can be disposed in or routed internally through otherwise empty chambers or passageways to provide protected, weather resistant, accessible controls. One type of reservoir hopper that is particularly well suited for the present invention is a reservoir hopper such as that shown in the figures. In this embodiment, hopper 1 has a replaceable front end 28 that can be replaced with a second front end 29 that is elongated in a forward direction. Second front end 29 permits the hopper capacity to be enlarged to suit a need for a higher continuous capacity before refilling. Preferably, such hoppers are shaped to present a minimum of exposed, forward-facing surface area that is exposed to an opponent in front of the player. My copending application Ser. No. 11/798,657 entitled "High capacity paintball hoppers and loaders and paintball feeder combinations with quick disconnect, permanent and integral connection configurations" filed on May 16, 2007 is a particularly preferred hopper system, the disclosure of which is hereby incorporated by reference.

Figure 5:
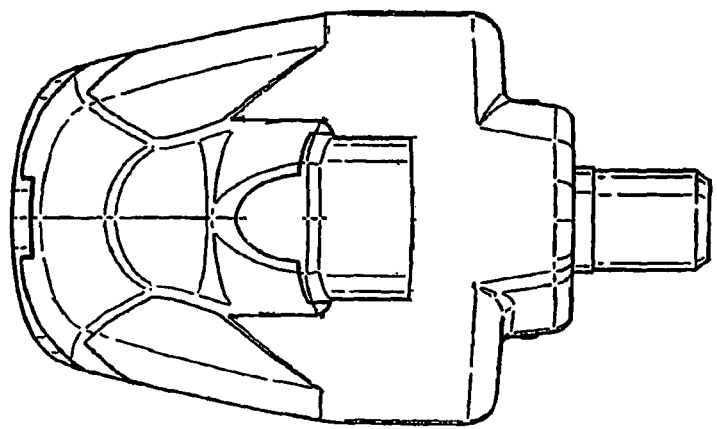
FIG. 5 shows a frontal view of the forward-facing surface area of a paintball reservoir hopper that would be exposed to an opponent during game play. Enhanced reservoir hopper capacity can be gained with replacement hopper sections without significantly increasing the exposed, front-facing surface area of the extended capacity is gained along the axis of the forward direction and within the shape of the reservoir hopper as viewed from the front of the hopper as properly installed.

In use, a reservoir hopper atop a paintball marker presents a forward-facing surface area that is exposed to an opponent. See, FIG. 5 which shows the exposed, forward-facing area of a paintball hopper from the perspective of an opponent. Because the rules of paintball play permit a player to be called "out" if a paintball round from an opponent breaks anywhere on the player or on anything carried by the player, the hopper atop the marker can serve as a substantial, forward-facing area that can be hit by an opponent. The art has thus developed designs for paintball reservoir hoppers that seek to maximize interior volume while minimizing the surface area that is exposed to an opponent when viewed from the forward end of the marker back towards the rear end where the player is located.

It is therefore believed that the operation and construction of the present invention will be apparent from the foregoing specification, drawings and description. It should be noted that while the apparatus shown and described herein characterize preferred embodiments, it will be clear that various changes and modifications could be made without departing from the scope of the described instant invention, and that such equivalents and modifications should be considered to fall within the scope of the following claims.

What is claimed is:

1. A paintball reservoir hopper apparatus for capturing imagery of play action and for supplying paintballs to a connected paintball marker, said hopper comprising:
   (a) a paintball reservoir hopper exhibiting a forward end away from a player using said hopper, a rear end facing toward a player using said hopper, left and right lateral side portions, a top portion and a bottom portion, said reservoir hopper having:
      (i) an enlarged first opening in said top surface that is dimensioned to permit multiple paintballs to pass through said first opening side-by-side at the same time but obstructed with a cover obstruction when disposed in a first position that prevents paintballs within said reservoir hopper from falling out but which can be displaced to a second position so as to allow additional paintballs to be introduced into said reservoir hopper through said first enlarged opening for refilling said reservoir hopper,
      (ii) a discharge neck in said bottom portion having a second diameter that is sufficiently small to allow only one paintball at a time to pass side-by-side through said diameter, said discharge neck having an elongated length sufficient to permit a plurality of paintballs to stack within said neck at the same time for discharge into a paintball marker attached thereto,
      (iii) a battery compartment that holds one or more batteries; and
      (iii) a motor drive powered by said one or more batteries in said battery compartment, wherein said motor drive feeds paintball rounds from said reservoir hopper toward said discharge neck;
   (b) at least one camera integrated into said reservoir hopper, powered by said one or more batteries and positioned to capture images from at least one of a forward direction, a left lateral direction, a right lateral direction and a rear direction, said at least one camera receiving power from said one or more batteries;
   (c) recordable storage media associated with said camera that is able to store captured images for later analysis and playback; and
   (d) an image display located at said rear end of said hopper and electrically associated with said at least one camera to permit the display of images captured by said at least one camera.

2. A paintball reservoir hopper according to claim 1 having more than one camera integrated into said hopper.

3. A paintball reservoir hopper according to claim 1 further comprising a wireless transmitter that is capable of wirelessly transmitting images from said at least one camera to a receiver separate from said hopper.

4. A paintball reservoir hopper according to claim 1 wherein a first camera faces from said forward end.

5. A paintball reservoir hopper according to claim 4 further comprising a second camera facing from said rear end.

6. A paintball reservoir hopper according to claim 1 further comprising a switch that turns on said image display.

7. A paintball reservoir hopper according to claim 1 further comprising USB port associated with said recordable storage media.

8. A paintball reservoir hopper according to claim 1 wherein said at least one camera has a resolution within the range of 1-20 megapixels.

9. A paintball reservoir hopper apparatus for capturing imagery of play action and for supplying paintballs to a connected paintball marker, said hopper comprising:
   (a) a paintball reservoir hopper exhibiting a forward end away from a player using said hopper, a rear end facing toward a player using said hopper, left and right lateral side portions, a top portion and a bottom portion, said reservoir hopper having:
      (i) an enlarged first opening in said top surface that is dimensioned to permit multiple paintballs to pass through said first opening side-by-side at the same time but obstructed with a cover obstruction when disposed in a first position that prevents paintballs within said reservoir hopper from falling out but which can be displaced to a second position so as to allow additional paintballs to be introduced into said reservoir hopper through said first enlarged opening for refilling said reservoir hopper, and
      (ii) a discharge neck in said bottom portion having a second diameter that is sufficiently small to allow only one paintball at a time to pass side-by-side through said diameter, said discharge neck having an elongated length sufficient to permit a plurality of paintballs to stack within said neck at the same time for discharge into a paintball marker attached thereto,
      (iii) a battery compartment that holds one or more batteries; and
      (iv) a motor drive powered by said one or more batteries in said battery compartment, wherein said motor drive feeds paintball rounds from said reservoir hopper toward said discharge neck;
   (b) at least one camera integrated into said reservoir hopper, powered by said one or more batteries and positioned to capture images from at least one of a forward direction, a left lateral direction, a right lateral direction and a rear direction, said at least one camera receiving power from said one or more batteries;
   (c) a wireless transmitter that is capable of wirelessly transmitting images from said at least one camera to a receiver separate from said hopper; and
   (d) an image display located at said rear end of said hopper and electrically associated with said at least one camera to permit the display of images captured by said at least one camera.

* * * * *